(12) United States Patent
Oe et al.

(10) Patent No.: US 7,122,274 B2
(45) Date of Patent: Oct. 17, 2006

(54) RECEPTACLE FOR BATTERY-USING EQUIPMENT

(75) Inventors: Hironobu Oe, Tsu (JP); Yoshihisa Inaba, Kadoma (JP)

(73) Assignee: Matsushita Electric Works, Ltd., Kadoma (JP)

( * ) Notice: Subject to any disclaimer, the term of this patent is extended or adjusted under 35 U.S.C. 154(b) by 341 days.

(21) Appl. No.: 10/070,819

(22) PCT Filed: Jul. 9, 2001

(86) PCT No.: PCT/JP01/05948

§ 371 (c)(1),
(2), (4) Date: Jul. 16, 2002

(87) PCT Pub. No.: WO02/05364

PCT Pub. Date: Jan. 17, 2002

(65) Prior Publication Data

US 2003/0059671 A1  Mar. 27, 2003

(30) Foreign Application Priority Data

Jul. 10, 2000 (JP) .............................. 2000-208984

(51) Int. Cl.
*H01M 10/38* (2006.01)
*H01M 2/10* (2006.01)
*H01R 3/00* (2006.01)

(52) U.S. Cl. .................. 429/123; 429/96; 439/500

(58) Field of Classification Search .................. 429/96, 429/122, 123, 170; 439/500, 607, 660, 736
See application file for complete search history.

(56) References Cited

U.S. PATENT DOCUMENTS

| 5,885,090 | A  | * | 3/1999  | Comstock et al. | ............ 439/65 |
| 5,909,102 | A  | * | 6/1999  | Stone et al.    | ................ 320/114 |
| 6,027,381 | A  | * | 2/2000  | Lok             | ........................... 439/736 |
| 6,077,130 | A  | * | 6/2000  | Hughes et al.   | .............. 439/862 |
| 6,302,727 | B1 | * | 10/2001 | Fedorjaka       | ................... 439/500 |
| 6,354,870 | B1 | * | 3/2002  | Timmerman       | ................ 439/569 |
| D486,448  | S  | * | 2/2004  | Watanabe et al. | .......... D13/120 |

FOREIGN PATENT DOCUMENTS

| JP | 7-73934   | 3/1995 |
| JP | 9-69374   | 3/1997 |
| JP | 2001-76782 | 3/2001 |

* cited by examiner

*Primary Examiner*—Gregg Cantelmo
(74) *Attorney, Agent, or Firm*—Oblon, Spivak, McClelland, Maier & Neustadt, P.C.

(57) ABSTRACT

In a receptacle of the invention for battery using apparatuses, when mounting it to a circuit board 30, an electrode contact portion 15 of a contact for a battery 5 disposed on an electrode disposing portion 7 is disposed so that its forward portion may protrude above a battery mounting portion 52. When mounting a battery 50 onto the battery mounting portion 52, an electrode 51 in a recess 50a is pressed against the electrode contact portion 15 in such an inclined state that the lower end of an end surface having an electrode 51 formed thereon is abutted against the right surface of the battery mounting portion 52 while raising the other end simultaneously and then the battery 50 is pushed forward to flex a slant strip 5e toward the side of an electrode disposing portion 7 while pressing down the other end, so that it can provide a large flexure allowance as compared to the case of flexing it vertically and resultantly enhance the contacting pressure, thus securing the connection with the battery electrode.

6 Claims, 12 Drawing Sheets

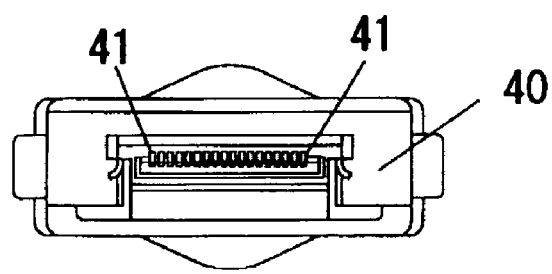
Fig. 9A
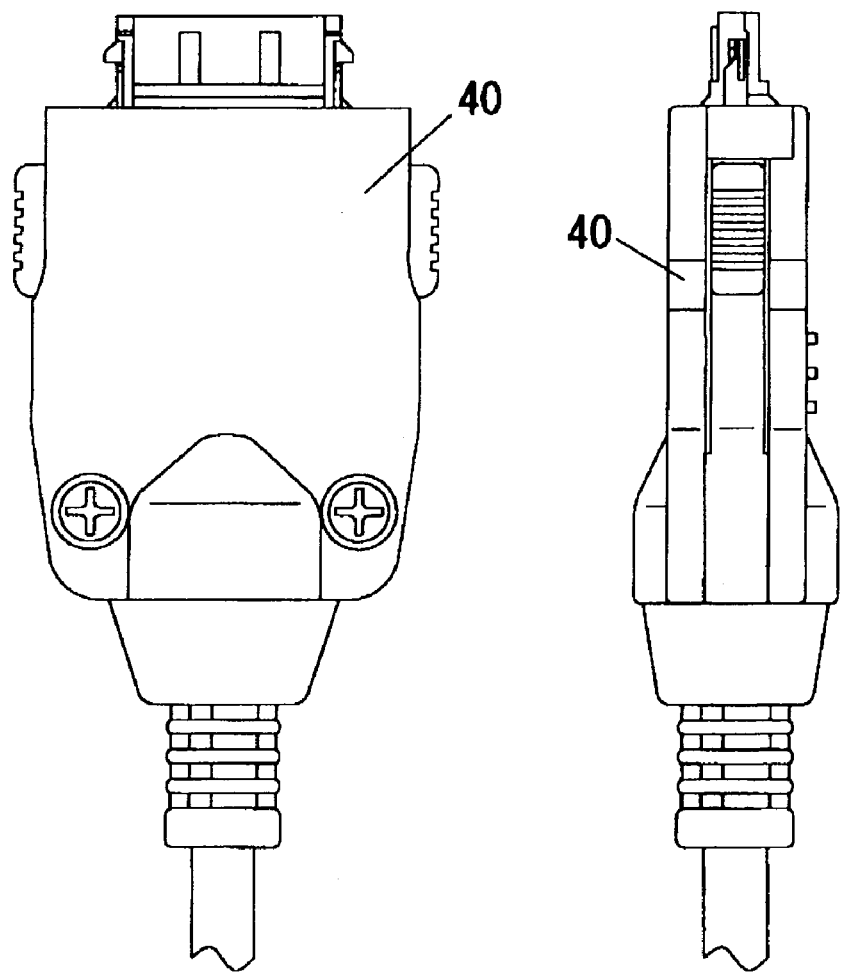
Fig. 9B  Fig. 9C

RECEPTACLE FOR BATTERY-USING EQUIPMENT

TECHNICAL FIELD

The invention relates to such a receptacle attached to electric apparatuses in which a battery is built, having a signal post which comes in contact with a signal contact of an external plug to transfer an electric signal to an electric apparatuses, and having contact for a battery to be connected with a battery electrode.

BACKGROUND ART

A receptacle integrated in mobile communication apparatuses with a battery for a power source is required to have thinner structure as such apparatuses have been compacted. A contact for a battery of the receptacle, on the other hand, needs to come in contact with a battery electrode with a sufficient spring pressure.

Such a receptacle has been provided with a construction as shown in FIGS, 10A–10D, FIG. 11, or FIGS. 12A–12C.

In such prior art examples, at the central front surface of a synthetic resin-made receptacle body 100, a planular rectangular cylinder 103 formed by folding a metal plate is disposed so that a recess 103a in the front surface opening surrounded by this cylinder 103 provides a plug inserting/removing portion. In this recess 103a, a tabular protrusive strip 101 protrudes as a whole from the central front surface of the receptacle body 100, and also a plurality of contact portions 102a of a signal post 102 is disposed on the under surface of this protrusive strip 101 to extend toward the tip of the protrusive strip 101 from the base so that a contact portion of a signal contact of an external plug inserted into the recess 103a may come in contact with the contact portion 102a of the signal post 102 to thereby transfer an electric signal.

The signal post 102 is guided out from the rear surface of the receptacle body 100 and folded so as to go along this rear surface and has its connecting portion 102b which is folded backward at a position near the bottom of the receptacle body 100 so as to be connected to a circuit board.

On both sides of the receptacle body 100, one pair of contacts for a battery 104 are disposed for each of positive and negative battery electrodes and, together with these, an electrode disposing portion 106 is provided to dispose a recharging electrode terminal 105.

In each of the electrode disposing portions 106, each pair of pressure-in housing 107 are disposed in parallel as a housing space for pressure-housing the contact for a battery 104. This pressure-in housing 107 has an opening from the upper surface to the rear surface of the electrode disposing portion 106, so that the contact for a battery 104 formed by folding a plate spring into a rough C-shape can be pressured from the upper surface opening into the pressure-in housing 107.

In this step, as shown in FIG. 12C, the contact for a battery 104 puts a bottom strip 104a on the bottom of the pressure-in housing 107 to cause a connecting portion 104b for circuit board connection provided at the tip of the bottom strip 104a to protrude to the outside and also cause the tip of a slant strip 104c to protrude to the outside from the upper surface opening of the pressure-in housing 107. At the tip of this slant strip 104c is provided a battery contact portion 108 forming a rough L-shaped strip formed roughly at a right angle with respect to the slant strip 104c so as to come in contact with an electrode of the battery side.

On the under surface of the electrode disposing portion 106 between the pressure-in housings 107 is provided the pressure-in housing 109 in the under surface opening as shown in FIG. 12B, into which pressure-in housing 109 is pressured the recharging electrode terminal 105 formed by folding a metal thin plate in a rough U-shape. This recharging electrode terminal 105 guides out to the rear of the electrode disposing portion 106 a board connecting portion 105a for connecting to a circuit board provided at the lower rear end and also causes an electrode 105b provided at the lower front end to be disposed so as to go along the recess 106a formed in the front surface of the electrode disposing portion 106.

In case of using a prior art example having such a configuration, such a construction is employed that a mating battery is provided with downward electrode, and a site where this battery electrode is provided may cover the receptacle body 100 to mount a battery onto a battery mounting portion so that the downward battery electrode may elastically come in contact with the contact portion 108 of the contact for a battery 104.

In this prior art example, since the end of the battery extends over the receptacle body 100, the battery is elongated and also the contact for a battery 104 is flexed vertically, so that its flexure allowance cannot be sufficient.

Also, the contact for a battery 104 and the recharging electrode terminal 105 are opposite to each other in the direction in which they are pressured into the electrode disposing portion 106, so that they cannot easily be assembled, thus increasing the man-hour requirements.

SUMMARY OF THE INVENTION

In view of the above, it is an object of the invention to provide such a receptacle for battery using apparatuses that can provide a contact for a battery with a sufficient flexure allowance and also that is capable of easily mounting a battery even with a narrow battery mounting portion.

It is another object of the invention to provide such a receptacle for battery using apparatuses that is capable of pressuring in a contact for a battery and a recharging electrode terminal at a time and also that is capable of pressuring in the contact for a battery easily.

A receptacle of the invention for battery using apparatuses comprises a plug inserting/removing portion where a plurality of signal post contact portions is disposed in parallel with each other which comes in contact with a signal contact of an external plug, a signal post connecting portion which is on the rear surface side of the plug inserting/removing portion and also which is connected to a circuit board, and an electrode disposing portion which is on the side surface side of the plug inserting/removing portion and also which is provided with a contact for a battery made of plate springs protruding in parallel with each other on the rear surface side of the plug inserting/removing portion, as well as the contact for a battery includes: a board connecting portion which is connected to the circuit board; a slant strip which is coupled with the board connecting portion, which protrudes toward the rear surface side of the electrode disposing portion, and which is flexible toward the electrode disposing portion; and an electrode contact portion which is formed at one tip of the slant strip, which has a rough U-shape protruding toward the rear surface side of the electrode disposing portion, and which comes in contact with the battery electrode.

Preferably the receptacle is provided with a housing space opened toward the under surface side and the rear surface side of the electrode disposing portion so that the contact for a battery may be pressured into this housing space.

More preferably the contact for a battery is provided, at its site extending from the board connecting portion to the slant strip, with a horizontal strip coupled to the board connecting portion and a vertical strip formed by extending from the other end of the slant strip and disposed along a vertical inner wall surface on the front surface side in the housing space into which the contact for a battery is pressured and also has such a configuration that a notch hole is formed at a boundary between the vertical strip and the horizontal strip and also that the lower end surface of the vertical strip which faces the notch hole is flatted.

Also, preferably the electrode disposing portion is provided with a recharging electrode terminal comprising a connecting portion which is connected to the circuit board and a contacting electrode portion which is disposed on the front surface side of the electrode disposing portion.

Further, more preferably the receptacle has the housing space opened toward the under surface side of the electrode disposing portion so that the recharging electrode terminal may be pressured into the housing space.

BRIEF DESCRIPTION OF THE DRAWINGS

FIG. 9A is a elevation view of a mating plug of the embodiment, FIG. 9B is a top view of the plug, and FIG. 9C is a side view of the plug;

Figure 1A:
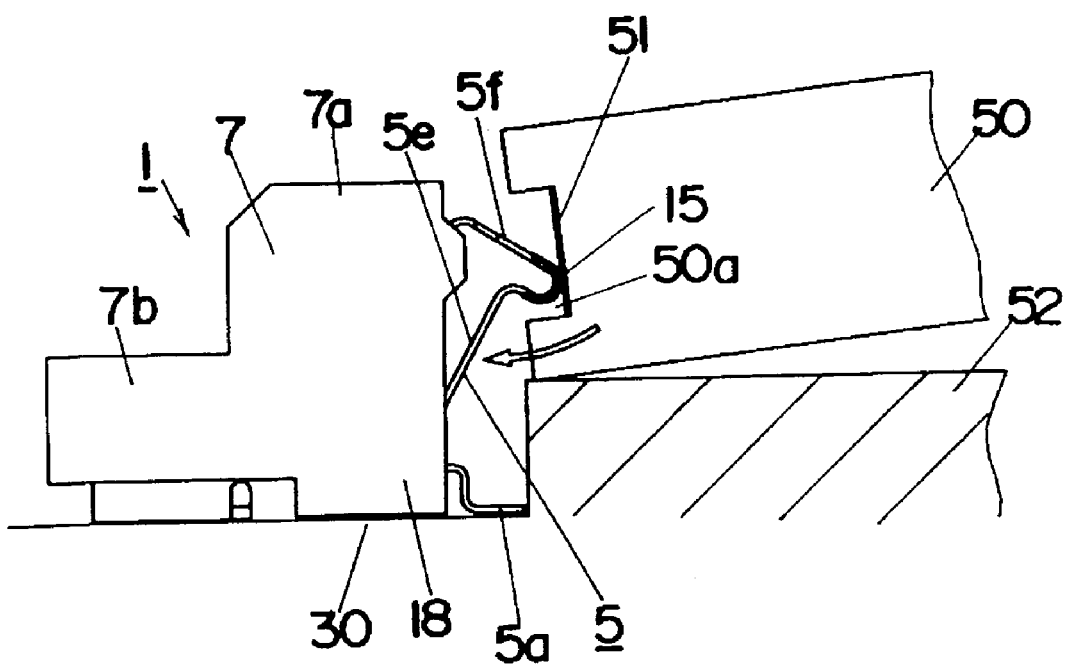
FIGS. 1A and 1B are illustrations for explaining a battery mounting portion according to one embodiment of the invention.

EXPLANATION OF REFERENCE NUMERALS 1 receptacle body,
5 contact for a battery,
5e slant strip,
5f extended strip,
7 electrode disposing portion,
7a higher portion,
7b lower portion,
15 electrode contact portion,
30 circuit board,
50 battery,
50a a recess,
51 electrode,
52 battery mounting portion.

BEST MODE FOR CARRYING OUT THE INVENTION

Figure 7A:
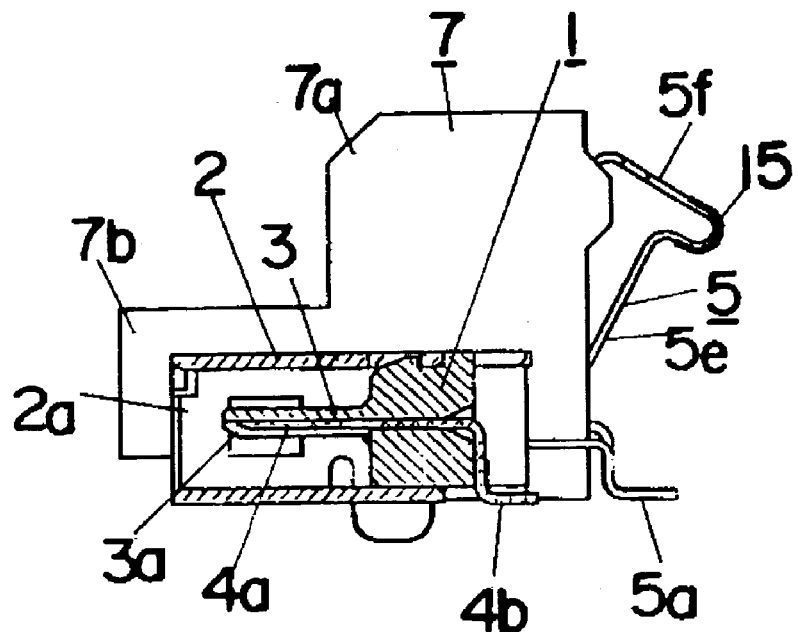
FIG. 7A is a cross-sectional view taken along line A—A of FIG. 2

As shown in FIGS. 2–6, a receptacle body 1 of this embodiment is molded of synthetic resin, at the central front surface of which is disposed a flattened rectangular cylinder 2 formed by folding a metal plate. A recess 2a in a front surface opening surrounded by the cylinder 2 constitutes a plug inserting/removing portion for an external plug 40 shown in FIG. 9, in which recess 2a a flat plate-shaped protrusive strip 3 protrudes integrally from the central front surface of the receptacle body 1. On the under surface of the protrusive strip 3, a plurality of strips of grooves 3a is disposed in parallel with each other into each of which contact portions 4a of the signal post 4 is fitted in such a manner as to extend toward the tip of the protrusive strip 3 from the base as shown in FIG. 7A, so that a signal contact 41 of the external plug 40 shown in FIG. 9 inserted into the recess 2a can come in contact with the contact portion 4a of the signal post 4 in order to transfer an electric signal.

Figure 4:
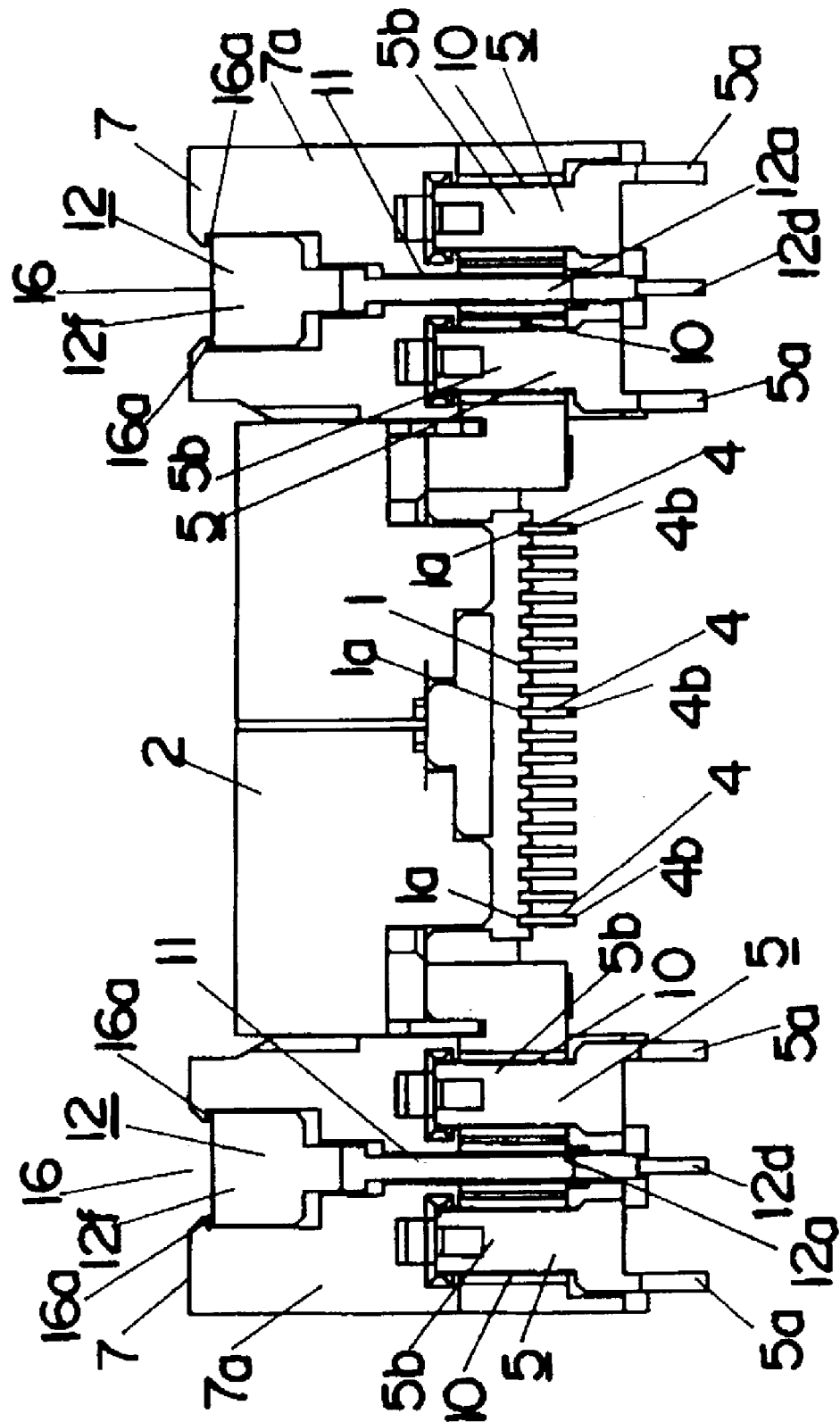
FIG. 4 is a bottom view of the embodiment.
Figure 5:
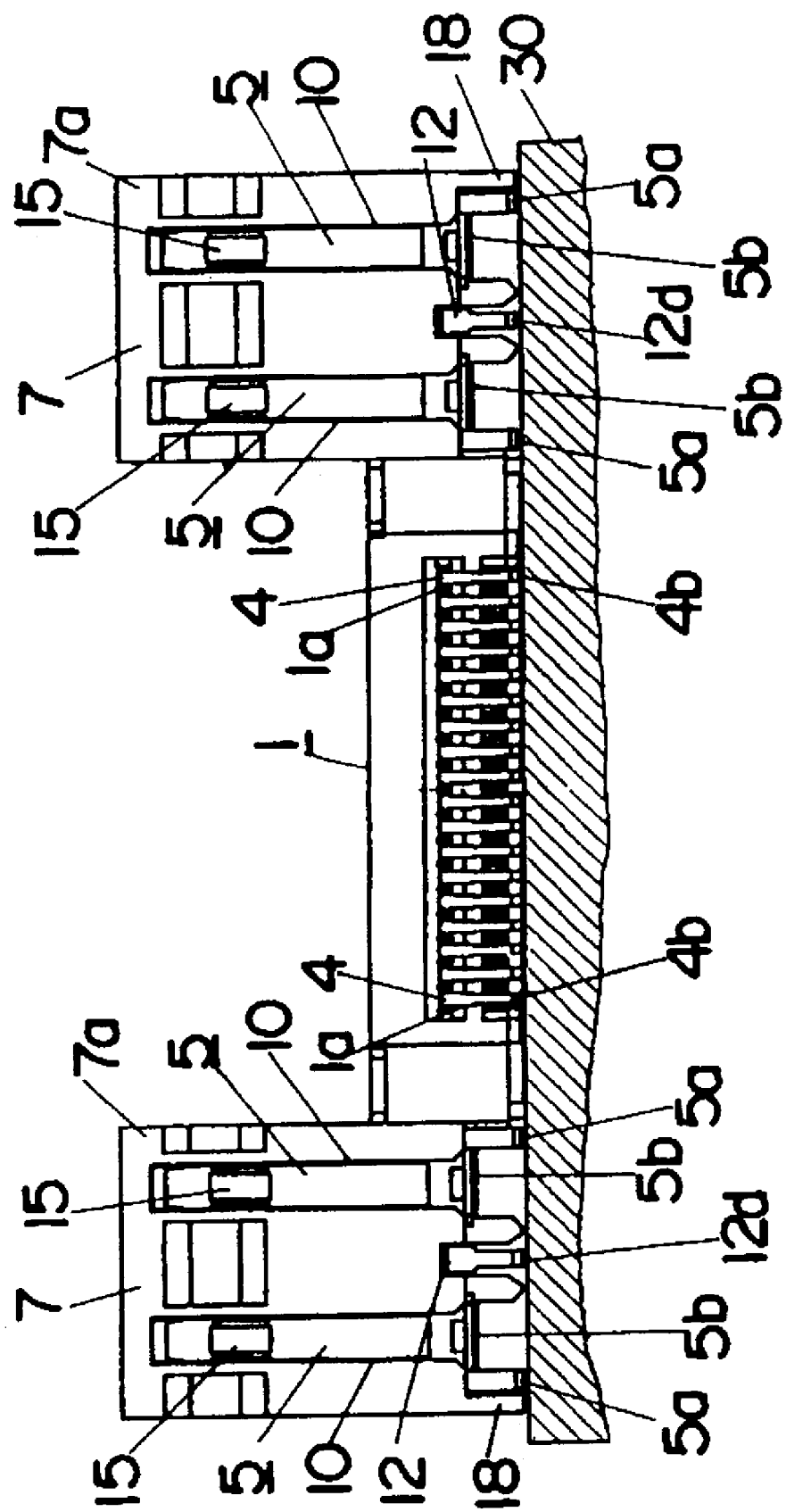
FIG. 5 is a rear view of the embodiment as mounted on a circuit board.
Figure 6:
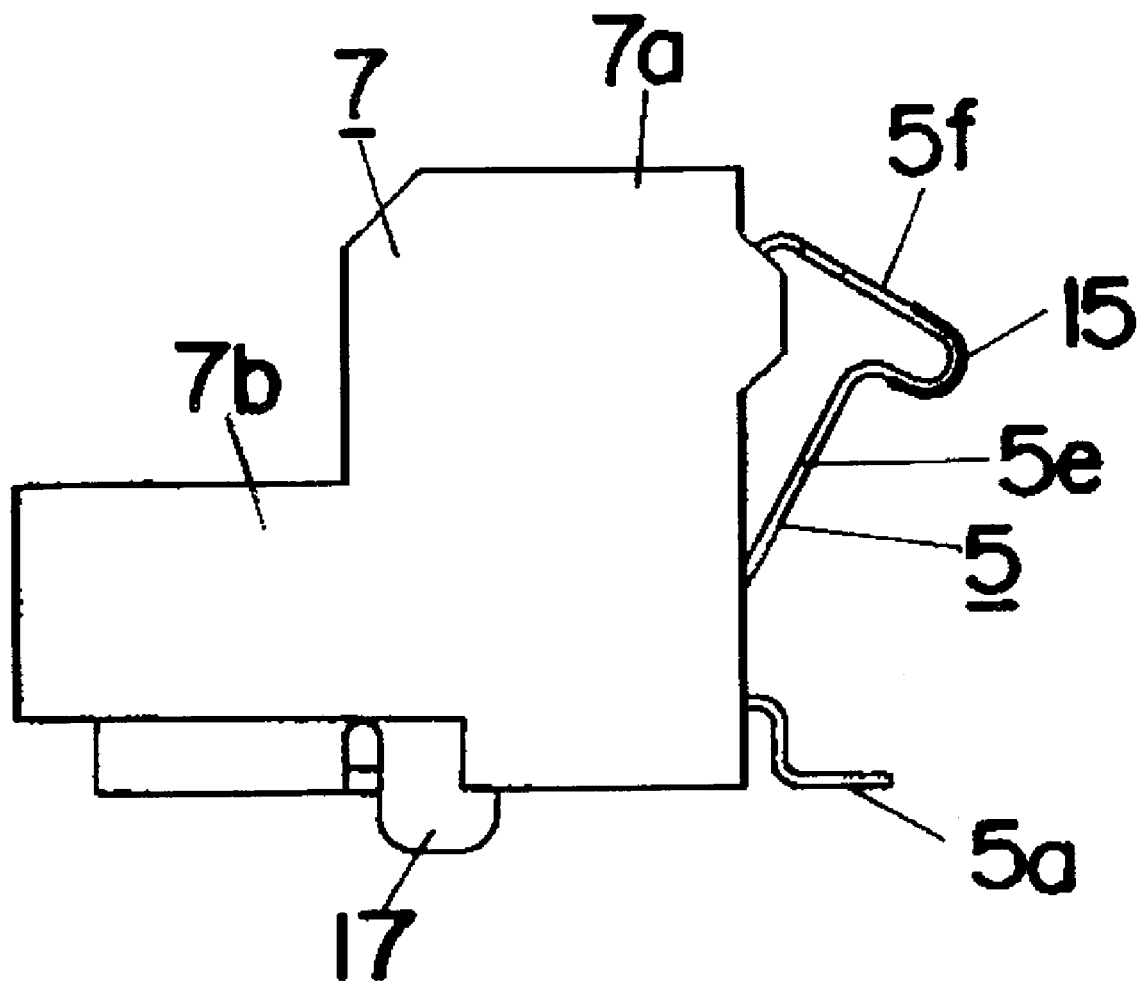
FIG. 6 is a side view of the embodiment.

Such a site of each signal post 4 that is guided out from the rear surface of the receptacle body 1 is folded downward along this rear surface to provide a folded strip, which is fitted into each of vertical grooves 1a disposed in parallel with each other on both sides on the rear surface of the receptacle body 1 as shown in FIGS. 4 and 5 and, further, folded rearward at a right angle at the lower end near the bottom surface of the receptacle body 1 to thereby protrude rearward from the rear surface of the receptacle body 1 to provide a rearward protrusive strip, which constitutes a connecting portion 4b which is connected to a circuit board 30. That is, the connecting portion 4b is located on the rear surface side of the plug insetting/removing portion.

Also, on the side face side of the plug inserting/removing portion, that is, on both sides of the receptacle body 1 is, as shown in FIG. 1, provided integrally an electrode disposing portion 7 in which are provided one pair of contact for a battery 5 for respectively connecting positive and negative electrodes 51 disposed in parallel with each other in a width direction in a recess 50a formed in one end face of the battery 50 and also a recharging electrode terminal 12.

As shown in the Figure, each electrode disposing portion 7 is comprised of a higher portion 7a which is higher at its rear portion than the receptacle body 1 and a lower portion 7b which continues from the front lower part of this higher portion 7a and extends in parallel with the side surface of the cylinder 2 in such a configuration that the rear part of the higher portion 7a extrudes in parallel with the connecting portion 4b of the signal post 4 and rearward from its tip and also has pressure-in housings 10 which serve as a housing space opened from roughly the upper end of its rear surface to the under surface, also forming a pressure-in housing 11 which serves as a housing space opened in such a manner as to extend through the middle of the opening site of the pressure-in housings 10 in the under surface of these higher portions 7a up to the under surface of the lower portion 7b.

Each pressure-in housing 10 is adapted to pressure the contact for a battery 5 into it, while the pressure-in housing 11 is adapted to pressure a recharging electrode terminal 12 into it.

Figure 8B:
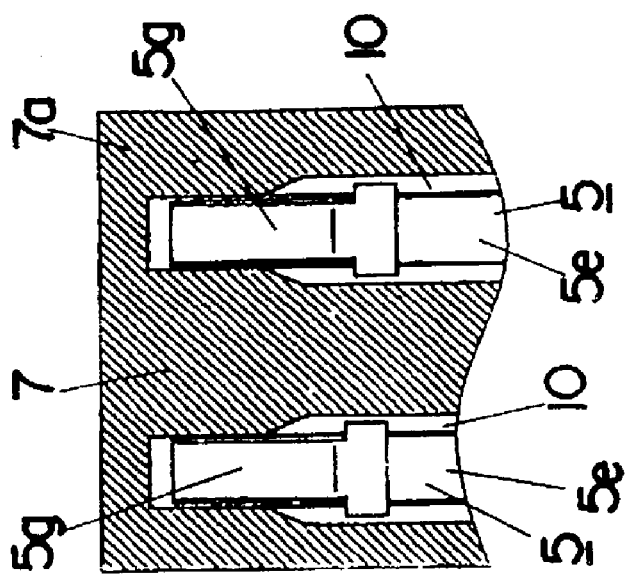
FIG. 8B is a cross-sectional view taken along line X—X of FIG. 8A.
Figure 8A:
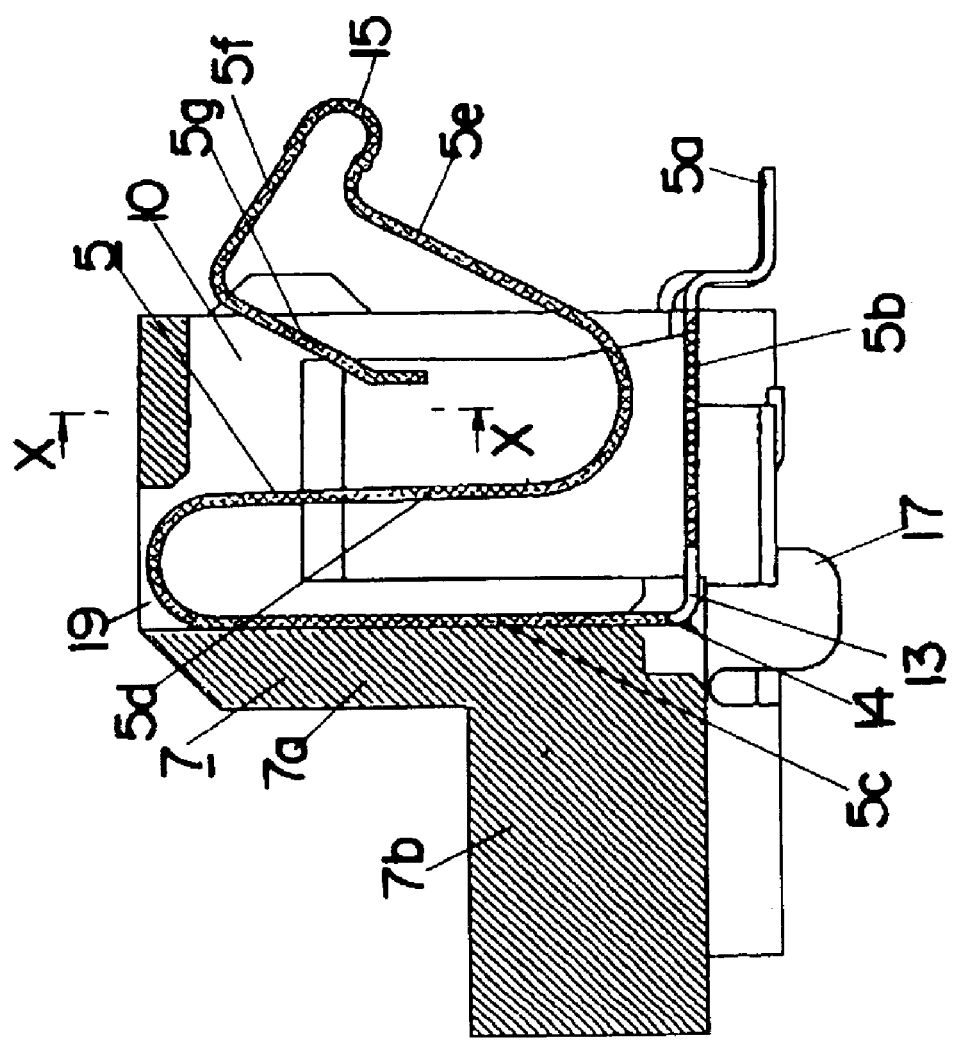
FIG. 8A is an expanded cross-sectional view taken along line B—B of FIG. 2
Figure 10A:
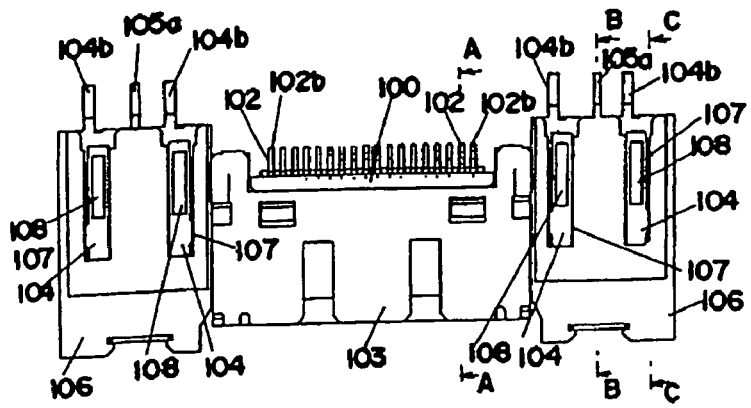
FIG. 10A is a top view of a prior art.
Figure 10B:
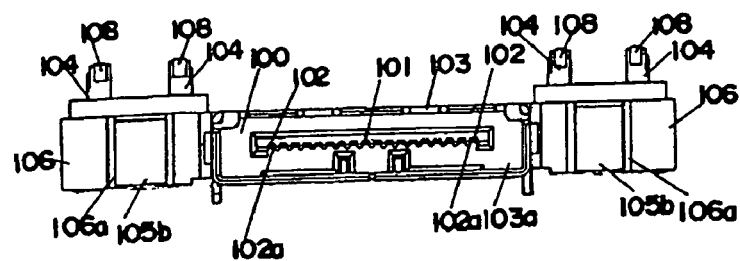
FIG. 10B is a elevation view of the prior art.
Figure 10C:
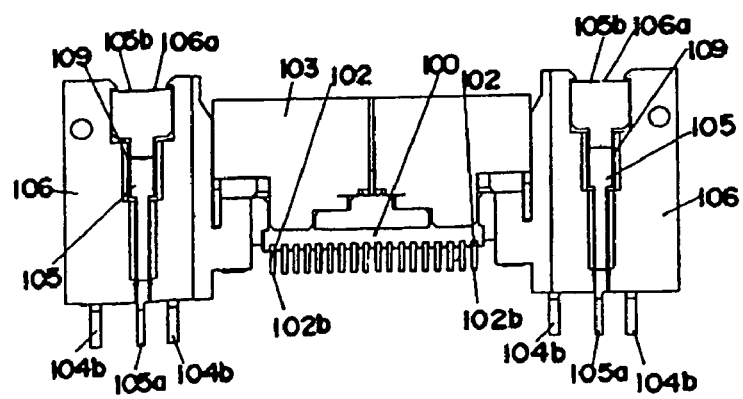
FIG. 10C is a bottom view of the prior art.
Figure 10D:
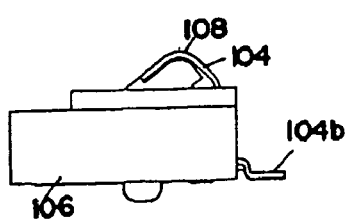
FIG. 10D is a side view of the prior art.
Figure 11:
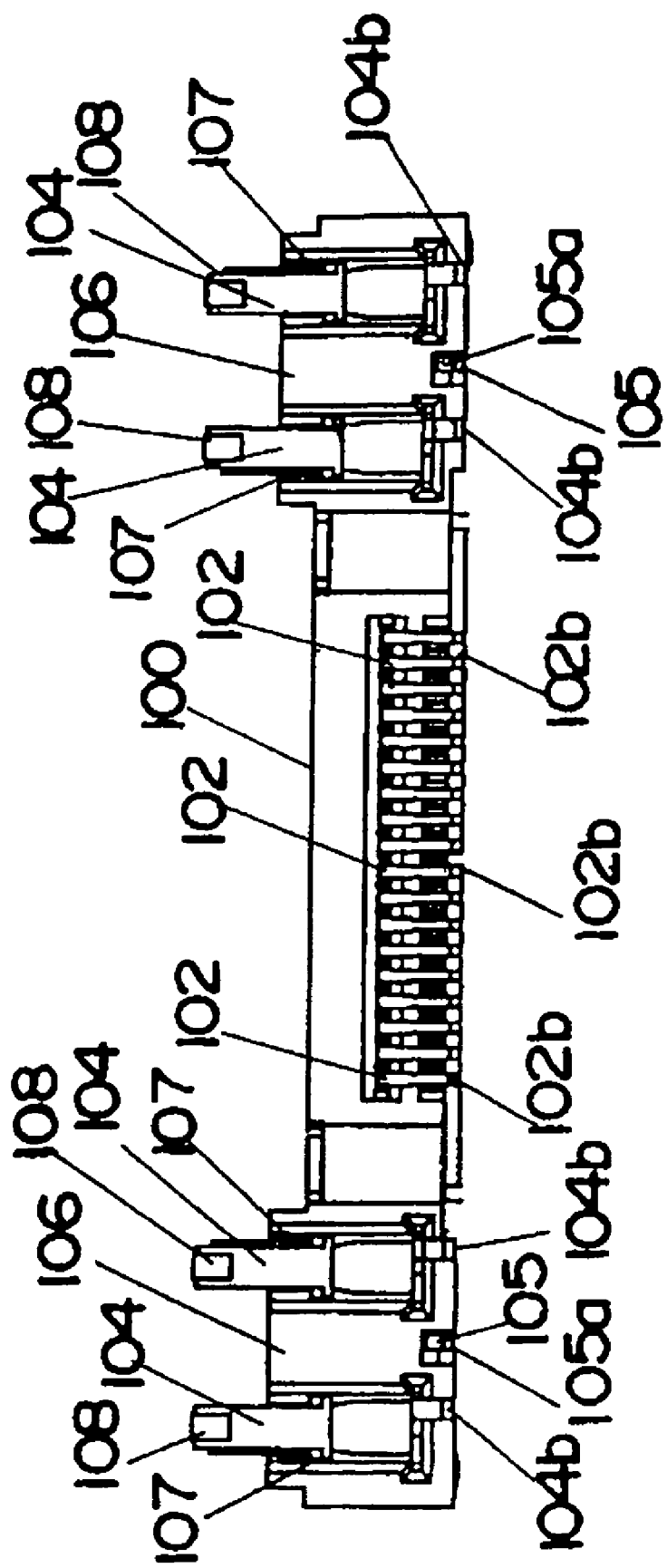
FIG. 11 is a rear view of the prior art.
Figure 12A:
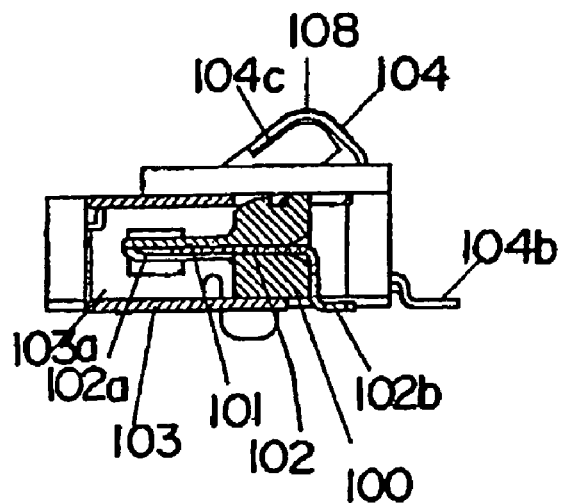
FIG. 12A is a cross-sectional view taken along line A—A of FIG. 10A.
Figure 12B:
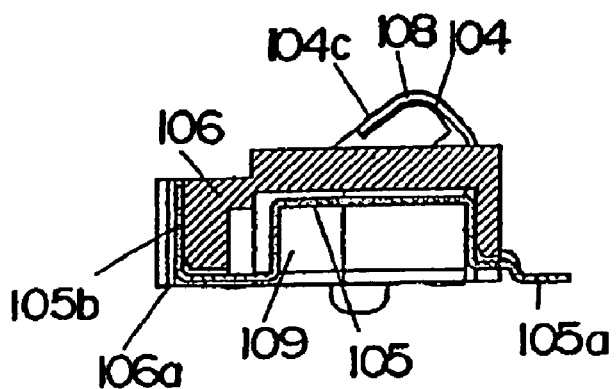
FIG. 12B is a cross-sectional view taken along line B—B of FIG. 10A.
Figure 12C:
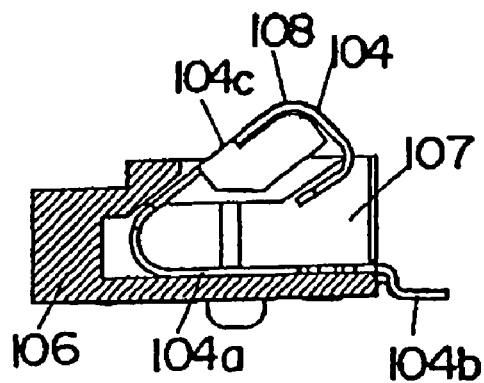
FIG. 12C is a cross-sectional view taken along line C—C of FIG. 10A.

As shown in FIG. 8A, the contact for a battery 5 is comprised of a plate spring including: a thin board-connecting portion 5a, which is connected to a circuit board 30, formed by folding and extending a flat strip 5b rearward in a L-shape from one side of one end of the flat strip 5b so as to provide a horizontal strip; a vertical strip 5c formed by folding and extending the flat strip 5b from the other end of the flat strip 5*b* at a right angle upward; a downward vertical strip 5*d* formed by folding back the upper end of this vertical strip 5*c* in a U-shape downward vertically above the flat strip 5*b* in such a manner as to be parallel with the vertical strip 5*c*; slant strip 5*e* formed by curving the downward vertical strip 5*d* from its lower end so that the forward portion may extend toward upward in a slant manner; an electrode contact portion 15 formed by folding the slant strip 5*e* in a U-shape from its lower end to provide a curved surface portion that faces the rear downward in a slant manner; an extended strip 5*f* formed by extending the folded tip of this electrode contact portion 15 upward in a slant manner; and a slant strip 5*g* formed by folding this extended strip 5*f* from its tip downward forwardly in a slant manner so as to be parallel with the slant strip 5*e*. In this configuration, a boundary between the flat strip 5*b* and the vertical strip 5*c* is provided with a notch hole 13, and the lower end surface of the vertical strip 5*c* facing the notch hole 13 is adapted to provide a flat surface 14. The plate spring is adapted to protrude in parallel with the rear surface side of the plug inserting/removing portion, that is, the rear surface side of the receptacle body.

Figure 7B:
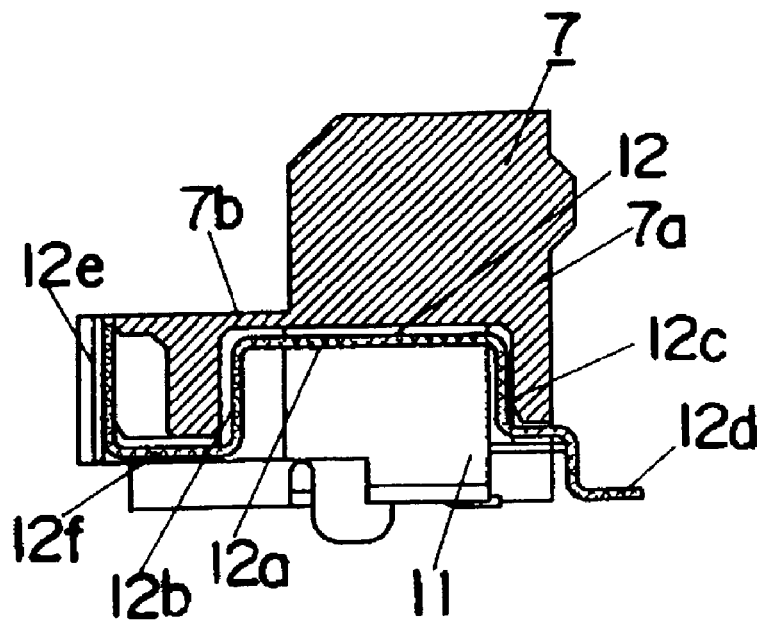
FIG. 7B is a cross-sectional view taken along line C—C of FIG. 2.

As shown in FIG. 7B, the recharging electrode terminal 12, on the other hand, includes: a wide front vertical strip 12*b* and a narrow rear vertical strip 12*c* which are formed by folding and extending downward a central strip 12*a* going along the ceiling surface of the pressure-in housing 11 from its front and rear ends respectively; a connecting portion 12*d* formed by folding and extending the rear vertical strip 12*c* from its lower end further in a Z-shape to provide a lower flat strip which connects to the circuit board 30; and a contacting electrode portion 12*e* formed by folding the tip of a wider extended strip 12*f* extended along the lower surface recess in the lower portion 7*b* forward from the lower end of the front vertical strip 12*b* further upward at a right angle.

By pressuring the contact for a battery 5 and the recharging electrode terminal 12 into their corresponding pressure-in housings 10 and 11 through the opening in the under surface side of each electrode disposing portion 7, they can be assembled into the electrode disposing portions 7 respectively. When they are thus pressured in, the electrode contact portion 15 of the contact for a battery 5 protrudes rearward from the opening in the rear surface of the electrode disposing portion 7.

Also, the contacting electrode portion 12*e* of the recharging electrode terminal 12 is inserted upward into a recess 16 formed in the front surface of the electrode disposing portion 7 so that both side edges thereof may be engaged into grooves 16*a* formed in both inner walls of the recess 16. The contacting electrode portion 12*e* is disposed on the front surface side of the electrode disposing portion 7.

In this pressure-in process, the contact for a battery 5 and the recharging electrode terminal 12 are pressured into the pressure-in housings 10 and 11 in the same direction and, therefore, can be dope so at a time.

Also, they are pressured into these housings with a jig for pressuring in the contact for a battery 5 as pressed against the flat surface 14 of the lower end of the vertical strip 5*c* of the contact for a battery 5 facing the notch hole 13 so that the vertical strip 5*c* may go along the forward vertical inner wall surface of the pressure-in housing 10. In this case, this jig is actually pressed against the flat surface 14, the contact for a battery 5 can be pressured in easily and smoothly.

Thus, the contact for a battery 5 and the recharging electrode terminal 12 can be pressured into the pressure-in housings 10 and 11 respectively, to thereby complete a receptacle of the invention for a battery using apparatus.

In the Figure, a reference numeral 17 indicates a protrusion formed on the cylinder 2 integrally for alignment with the circuit board 30, a reference numeral 18 indicates a loading leg integrally formed on the under surface of each electrode disposing portion 7, and a reference numeral 19 indicates an opening formed in the ceiling of the pressure-in housing 10.

Figure 1B:
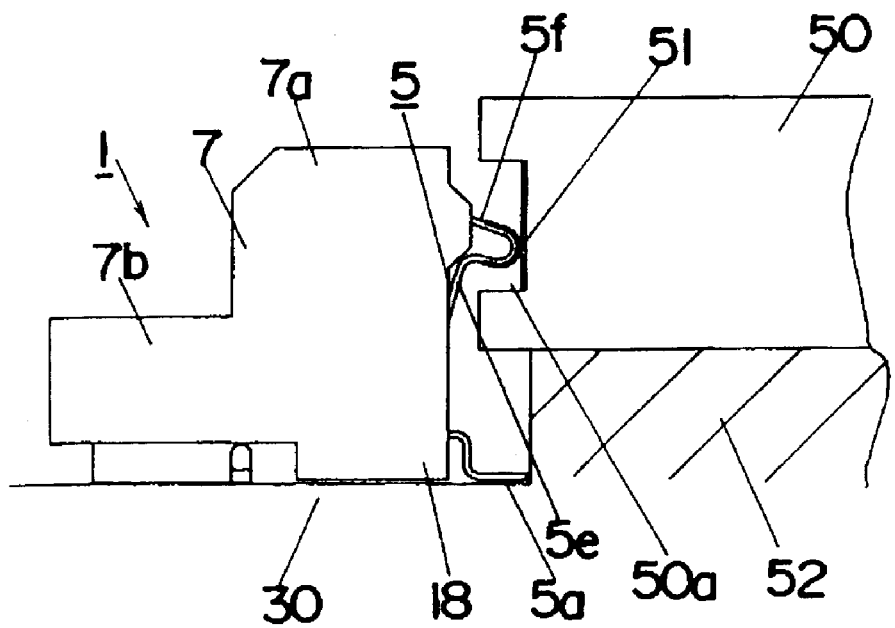
Figure 2:
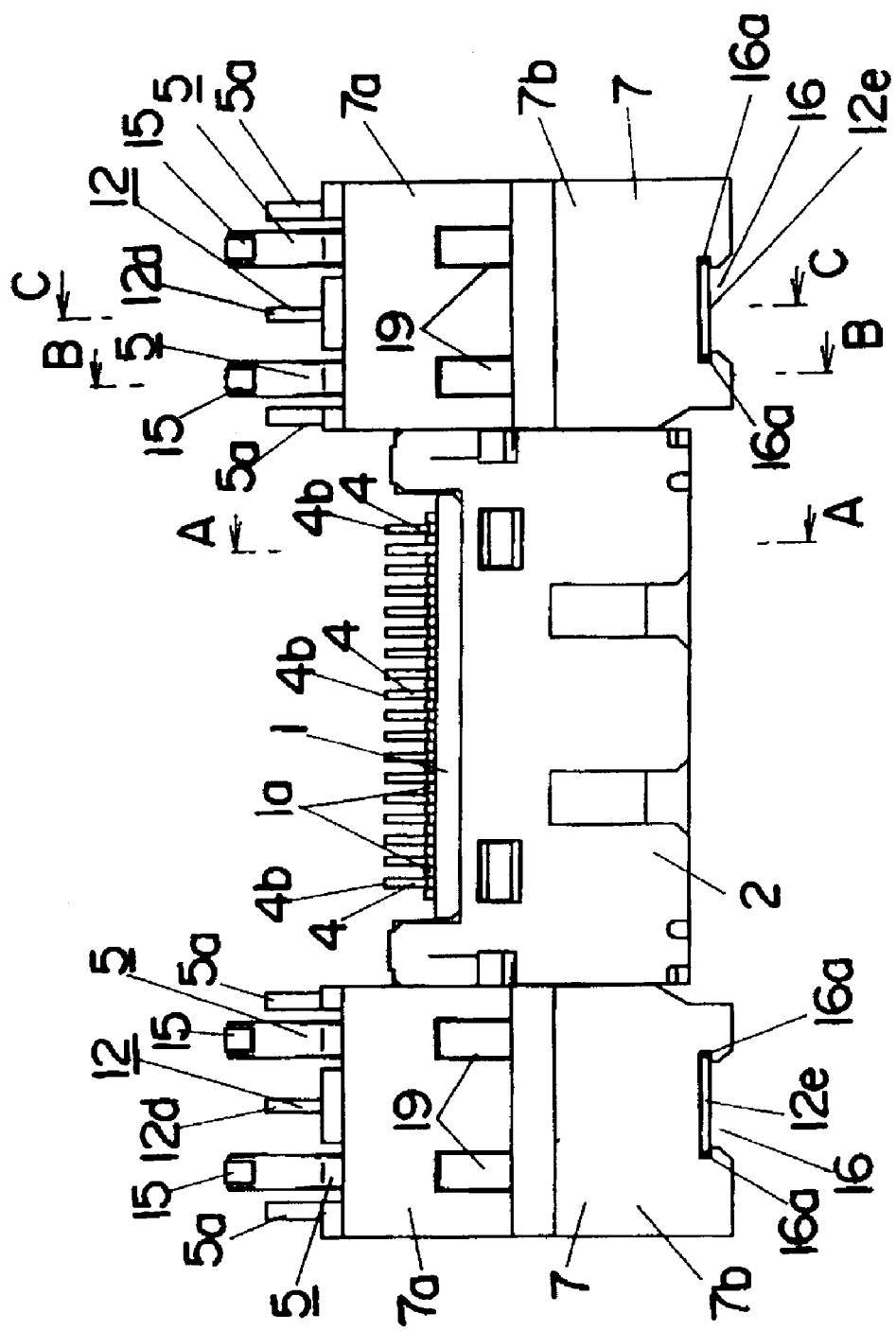
FIG. 2 is a top view of the embodiment.
Figure 3:
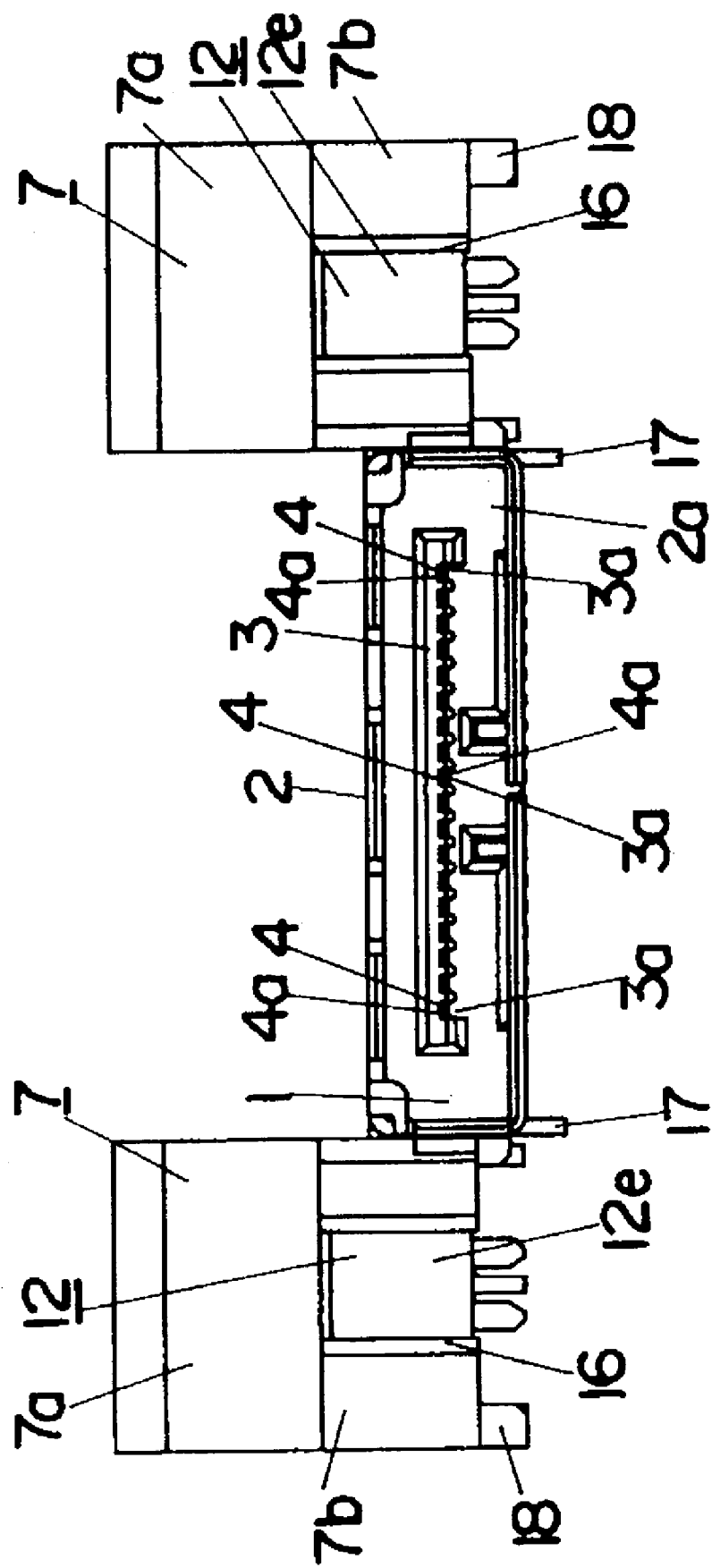
FIG. 3 is an elevation view of the embodiment.

Thus, to assemble the receptacle of the invention into an electric apparatus, as shown in FIGS. 1A and 1B, it is actually mounted onto the circuit board 30 which is formed one step lower than a battery mounting portion 52. In doing so, the electrode contact portion 15 of the contact for a battery 5 is disposed so that its forward portion may protrudes above the battery mounting portion 52.

To mount the battery 50 onto the battery mounting portion 52, the battery 50 is held as inclined as pressing the lower end of the end surface having the electrode 51 formed thereon against the upper surface of the battery mounting portion 52 while simultaneously raising the other end as shown in FIG. 1A, to thereby press the electrode 51 in the recess 50*a* against the electrode contact portion 15.

In this state, the battery 50 is pushed forward and also pressed downward as flexing the slant strip 5*e* toward the electrode disposing portion 7, to thereby be mounted on the battery mounting portion 52 as shown in FIG. 1B. In this mounted state thereof, the battery 50 has its electrode 51 pressed by the electrode contact portion 15 owing to the spring elasticity of the slant strip 5*e*, so that the battery 50 is held between this electrode contact portion 15 and a wall (not shown) provided on the other end side of the battery mounting portion 52. An arrow in the Figure indicates the movement of the battery 50.

To dismount thus mounted battery 50, in a state shown in FIG. 1B, the battery 50 is moved forward against the spring elasticity of the slant strip 5*e* of the contact for a battery 5 to thereby give a gap between the above-mentioned wall and the other end side of the battery 50, so that in this state the battery 50 is inclined as raising the other end side thereof to thereby be dismounted off above the battery mounting portion 52.

Note here that the circuit board 30 may be molded integrally with the battery mounting portion 52.

INDUSTRIAL APPLICABILITY

As mentioned above, the receptacle of the invention for battery using apparatuses comprises a plug inserting/removing portion where a plurality of signal post contact portions is disposed in parallel with each other which comes in contact with a signal contact of an external plug, a signal post connecting portion which is on the rear surface side of the plug inserting/removing portion and also which is connected to a circuit board, and an electrode disposing portion which is on the side surface side of the plug inserting/removing portion and also which is provided with a contact for a battery made of plate springs protruding in parallel with each other on the rear surface side of the plug inserting/removing portion, as well as the contact for a battery includes a board connecting portion which is connected to the circuit board, a slant strip which is coupled with the board connecting portion, which protrudes toward the rear surface side of the electrode disposing portion, and which is flexible toward the electrode disposing portion, and an electrode contact portion which is formed at one tip of the slant strip, which has a rough U-shape protruding toward the rear surface side of the electrode disposing portion, and which comes in contact with the battery electrode, so that by elastically mounting the electrode to the electrode contact portion of the contact for a battery with one end surface having the battery electrode provided thereon as facing downward and then pressing down the battery as pressingly flexing the slant strip, the battery can be mounted in connection. With this, it is possible to downsize the battery mounting portion as compared to the case of pressing the electrode provided on the under surface against the battery contact portion in such a manner that the battery end may cover the contact body and, resultantly, to use a small sized battery with a short distance between the ends thereof. Moreover, the slant strip is flexed in the back and forth direction of the electrode disposing portion, to provide a larger flexure allowance than the case of flexing it vertically and resultantly enhance the contacting pressure, thus providing an effect of securing the connection between the battery and the electrode.

Also, by providing a housing space opened toward the under surface and rear surface sides of the electrode disposing portion to thereby house by pressure the contact for a battery therein, the contact for a battery having the abovementioned configuration can be disposed to the electrode disposing portion effectively.

Further, the contact for a battery can be provided, at its site extending from the board connecting portion to the slant strip, with a horizontal strip coupled to the board connecting portion and a vertical strip formed by extending from the other end of the slant strip and disposed along a vertical inner wall surface on the front surface side in the housing space into which the contact for a battery is pressured and also has such a configuration that a notch hole is formed at a boundary between the vertical strip and the horizontal strip and also that the lower end surface of the vertical strip which faces the notch hole is flatted, to use a jig to thereby press the lower end flat surface of the vertical strip when the contact for a battery is pressured in, thus additionally giving an effect of facilitating the pressure-in operation.

Also, the electrode disposing portion can be provided with a recharging electrode terminal comprising a connecting portion which is connected to the circuit board and a contacting electrode portion which is disposed on the front surface side of the electrode disposing portion, as well as a housing space opened toward the under surface side of the electrode disposing portion so that the recharging electrode terminal may be pressured into the housing space, to pressure in the recharging electrode terminal and the contact for a battery in the same direction, thus additionally giving an effect of reducing the assembling man-hour requirements.

What is claimed is:

1. A receptacle for battery-using apparatuses, comprising:
   a plug inserting/removing portion where a plurality of signal post contact portions is disposed in parallel with each other which come in contact with a signal contact of an external plug;
   a signal post connecting portion on a rear surface side of said plug inserting/removing portion and connected to a circuit board; and
   an electrode disposing portion on a side surface of said plug inserting/removing portion and provided with a contact for a battery comprising plate springs protruding in parallel with each other on the rear surface side of said plug inserting/removing portion,
   wherein said contact comprises:
      a board connecting portion connected to the circuit board;
      a slant strip coupled with the board connecting portion, which protrudes toward the rear surface side of said electrode disposing portion, and which is flexible toward the electrode disposing portion; and
      an electrode contact portion formed at one tip of the slant strip, which has a U-shape protruding toward the rear surface side of said electrode disposing portion, and which comes in contact with the battery electrode;
   wherein:
   the electrode disposing portion defines a housing space for housing by pressure the contact for a battery into the housing space;
   wherein the contact comprises, the board connecting portion, a horizontal strip coupled to said board connection portion, a first vertical strip coupled to the horizontal strip and disposed along a vertical inner wall surface on a front surface side in the housing space, a second vertical strip coupled to the first vertical strip in a parallel direction to the first vertical strip, and a slant strip extending from the second vertical strip; and
   wherein a notch hole is formed at a boundary in between the vertical strip and said horizontal strip so that a lower end surface of the vertical strip which faces the notch hole is flattened.

2. A receptacle for battery using apparatuses, comprising:
   a plug inserting/removing portion where a plurality of signal post contact portions is disposed in parallel with each other which come in contact with a signal contact of an external plug;
   a signal post connecting portion on a rear surface side of the plug inserting/removing portion and connected to a circuit board; and
   an electrode disposing portion on a side surface of the plug inserting/removing portion and provided with a contact for a battery comprising plate springs protruding in parallel with each other on the rear surface side of the plug inserting/removing portion,
   wherein the contact comprises:
      a board connecting portion connected to the circuit board;
      a slant strip coupled with the board connecting portion, which protrudes toward the rear surface side of the electrode disposing portion, and which is flexible toward the electrode disposing portion; and
      an electrode contact portion formed at one tip of the slant strip, which has a U-shape protruding toward the rear surface side of the electrode disposing portion, and which comes in contact with the battery electrode,
   wherein the electrode disposing portion defines a housing space opened toward an under surface side and a rear surface side of the electrode disposing portion to thereby house by pressure the contact, and
   wherein:
   the contact comprises, the board connecting portion, a horizontal strip coupled to said board connecting portion, a first vertical strip coupled to the horizontal strip and disposed along a vertical inner wall surface on a front surface side in the housing space, a second vertical strip coupled to the first vertical strip in a parallel direction to the first vertical strip, and a slant strip extending from the second vertical strip; and
   a notch hole is formed at a boundary between the vertical strip and said horizontal strip so that a lower end surface of the vertical strip which faces the notch hole is flattened.

3. The receptacle according to claim 1, wherein the electrode disposing portion is provided with a recharging electrode terminal comprising:
   a connecting portion connected to the circuit board; and
   a contacting electrode portion disposed on the front surface side of the electrode disposing portion.

4. The receptacle according to claim 3, wherein the housing space opens toward an under surface side of the electrode disposing portion to thereby house by pressure the recharging electrode terminal in the housing space.

5. The receptacle according to claim 1, wherein the housing space opens toward an under surface side of the electrode disposing portion to house by pressure the contact into the housing space through the opening in the under surface side of the electrode disposing portion.

6. A receptacle for battery-using apparatuses, comprising:
   a plug inserting/removing portion where a plurality of signal post contact portions is disposed in parallel with each other which come in contact with a signal contact of an external plug;
   a signal post connecting portion on a rear surface side of said plug inserting/removing portion and connected to a circuit board; and
   an electrode disposing portion on a side surface of said plug inserting/removing portion and provided with a contact for a battery comprising plate springs protruding in parallel with each other on the rear surface side of said plug inserting/removing portion,
   wherein said contact comprises:
      a board connecting portion connected to the circuit board;
      a slant strip coupled with the board connecting portion, which protrudes toward the rear surface side of said electrode disposing portion, and which is flexible toward the electrode disposing portion; and
      an electrode contact portion formed at one tip of the slant strip, which has a U-shape protruding toward the rear surface side of said electrode disposing portion, and which comes in contact with the battery electrode; and
   wherein:
   the contact is provided, at a site extending from the board connecting portion to the slant strip, with a vertical strip disposed along a vertical inner wall surface on a front surface side in a housing space into which the contact is pressured;
   the housing space opens toward an under surface side of the electrode disposing portion to house by pressure the contact into the housing space through the opening in the under surface side of the electrode disposing portion;
   the contact comprises the board connecting portion, a horizontal strip coupled to the board connecting portion, a first vertical strip coupled to the horizontal strip and disposed along a vertical inner wall surface on a front surface side in the housing space into which the contact is housed by pressure, a second vertical strip coupled to the first vertical strip in a parallel direction to the first vertical strip, and a slant strip extending from the second vertical strip; and
   a notch hole is formed at a boundary between the vertical strip and the horizontal strip so that a lower end surface of the vertical strip which faces the notch hole is flattened.

* * * * *